United States Patent
Eagle et al.

(10) Patent No.: US 7,865,381 B2
(45) Date of Patent: Jan. 4, 2011

(54) METHOD AND SYSTEM FOR OBJECTIVELY OPTIMIZING MANUFACTURING SOURCING

(75) Inventors: David Eagle, Cary, NC (US); David M. Glinski, Rochester, MN (US); Donald D. Gunvalsen, Elizaville, NY (US); James A. O'Connor, Ulster Park, NY (US); Thomas N. Paske, Oronoco, MN (US); Edward W. Peterson, Ulster Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1112 days.

(21) Appl. No.: 11/172,564

(22) Filed: Jun. 30, 2005

(65) Prior Publication Data

US 2007/0011062 A1    Jan. 11, 2007

(51) Int. Cl.
 *G06Q 10/00*    (2006.01)
(52) U.S. Cl. .................. 705/7; 705/8; 705/500; 700/92; 700/97
(58) Field of Classification Search .............. 705/7, 705/8, 500; 700/92, 97
See application file for complete search history.

(56) References Cited

U.S. PATENT DOCUMENTS

| | | | |
|---|---|---|---|
| 5,774,121 A * | 6/1998 | Stiegler | 715/769 |
| 6,301,516 B1 | 10/2001 | Ostrowski et al. | |
| 7,117,161 B2 * | 10/2006 | Bruce | 705/8 |
| 2002/0049621 A1 | 4/2002 | Bruce | |
| 2002/0052862 A1 | 5/2002 | Scott et al. | |
| 2002/0174000 A1 * | 11/2002 | Katz et al. | 705/7 |
| 2004/0039665 A1 | 2/2004 | Ouchi | |
| 2004/0098300 A1 | 5/2004 | Karwatowski et al. | |
| 2004/0117290 A1 * | 6/2004 | Shacham | 705/37 |
| 2004/0186757 A1 * | 9/2004 | Starkey | 705/7 |
| 2006/0167741 A1 * | 7/2006 | Erickson et al. | 705/10 |

OTHER PUBLICATIONS

Nellore, Rajesh, et al., Strategic Outsourcing Through Specifications, (2000) Omega 28: The International Journal of Management Science, pp. 525-540.*

Novak, Sharon and Eppinger, Steven, D., Sourcing by Design: Product Complexity and the Supply Chain, (Jan. 2001), Management Science vol. 47, No. 1, pp. 189-204.*

Humpreys, P. et al., An expert system for evaluating the make or buy decision, Computers & Industrial Engineering 42 (2002) 567-585.*

(Continued)

*Primary Examiner*—Beth V Boswell
*Assistant Examiner*—Tiphany B Dickerson
(74) *Attorney, Agent, or Firm*—Jon A. Gibbons; Fleit Gibbons Gutman Bongini & Bianco PL (57) ABSTRACT

A scientific complexity quantification system calculates a specific percent complexity index rating for each manufactured product that can be graphed and compared to other products and that is based on mathematical quantifications of each product's key attributes. The complexity index takes into consideration differences in design and manufacturing complexity, financial considerations, product solution complexity and customer experience. The attribute scoring of individual products are then sorted into potential sourcing categories, such as "outsource," "in house fulfillment," or "further evaluation needed."

23 Claims, 6 Drawing Sheets

OTHER PUBLICATIONS

Platts, K.W. et al, Make vs. buy decisions: A process incorporating multi-attribute decision-making, Int. J. Production Economics 77 (2002) 247-257.*

Calinescu, A., Applying and Assessing Two Methods for Measuring Complexity in Manufacturing, The Journal of the Operational Research Society, vol. 49, No. 7, Intelligent Management Systems in Operations (Jul. 1998), pp. 723-733.*

Hwang, Heung-Suk, "Web-based multi-attribute analysis model for engineering project evaluation" Computers & Industrial Engineering 46 (2004) 669-678.*

Yassine, Ali, et al., "A Systems Approach to Engineering Management Decision Making Using the Decision Analysis Paradigm."

Bhatia, K., et al., "Towards a Model for Outsourcing Acceptance Testing: Issues, Challenges and Best Practices," 4$^{th}$ Annual Software Testing Conference, QAI India.

Nellore et al., "Strategic Outsourcing Through Specifications," Omega, v. 28, n. 5, pp. 525-540, Oct. 2000, Abstract Only.

Kennedy, "Modeling In-House vs. Contract Maintenance, with Fixed Costs and Learning Effects," Int'l. Journal of Production Economics, v. 32, n. 3, pp. 277-283, Nov. 1993, Abstract Only.

* cited by examiner

METHOD AND SYSTEM FOR OBJECTIVELY OPTIMIZING MANUFACTURING SOURCING

BACKGROUND OF THE INVENTION

1. Field of the Invention

The present invention relates generally to manufacturing sourcing and more particularly, to a system and method for objectively assessing a product's manufacturing complexity based on various product criteria.

2. Background of the Invention

The world has become a global economy. As a result, more and more Unites States based companies are taking advantage of cheaper resources, such as labor and materials, available in other countries. In recent years, computer and electronics companies have looked increasingly to outsourcing of development and manufacturing work as a strategy to reduce development and manufacturing expense. If used for the correct subset of products and properly executed, outsourcing can make a business more efficient by reducing the overall end-to-end costs. On the other hand, if used for products that are excessively complex to manufacture and/or executed improperly, outsourcing can result in increased overall end-to-end costs. Additionally, outsourcing products that are excessively complex to manufacture and/or executed improperly can lead to decreased quality which offsets any initial saving with increased warranty costs and potential revenue loss due to customer dissatisfaction.

Although the concept may seem straight forward, in practice, making the correct decision on which products, subassembly designs, and manufacturing work to outsource, and which to continue to keep in house (at the domestic manufacturing facility), is difficult. At the highest level, to make the correct decision, all that needs to be done is to determine which products are at the basic end of the scale and which are at the complex end.

Basic products would be in a group consisting of those products and subassemblies that are easy to design and easy to manufacture. The basic product group would be those products that typically represent "Low-End" (LE) products, or those that require less-skilled lower-cost labor. Low end products would be among the first product candidates to outsource since they are generally easier to design and relatively easy to manufacture.

A second group of products, the "complex" products, consist of more "High-End" (HE) products that may require specialized skills, more experienced workers, unique tools, and a specialized infrastructure for product development, manufacturing, and testing. The design, manufacturing, and testing of these high-end products would most often remain in house and in the hands of experienced teams that have already developed these specialized skills. Additionally, many products are the result of cutting edge not-yet-disclosed intellectual property (IP) of all types that must be contained and protected by the company so that it remains a secret to competitors. Being careful to keep high-end products in-house minimizes risk and ensures that consistent product quality is maintained.

In practice, determining which products are basic, which are complex, and which are in between is a difficult endeavor. The determination cannot be made by only considering which are HE products and which are LE products. For example, a mainframe computer would typically be thought of as a HE "scale up" type system, i.e., a complex product. But what about a cluster of basic computers? Does a cluster of computers become a complex system or just a collection of basic computers? This type of system may utilizes some of the most basic LE servers configured together to behave as a single "more complex" system. This is sometimes referred to as a "scale out" system.

The question then becomes, should a clustered system fall into the LE group if its primary building blocks are LE products or should it be part of the HE group since the cluster can be viewed as a high-performance complex system ordered as an single entity? Other considerations factor in, such as how the customer views the product and what their expectations are about its functional characteristics and quality.

To give a specific example, Blades™ servers, manufactured by International Business Machines, Inc., are relatively new. A single Blade™ computer is an example of a LE high-performance computer. The single Blade™ computer typically has a single board. Blade™ computers are interconnected via a high-speed network (typically Ethernet) build right into a pluggable planar board structure to form a Blade™ center. A further complication to the determination of product complexity is that different types of single Blade™ computers can coexist in a single Blade's™ center. There may be an Intel Blade™ computer, a Power Blade™ computer, and a storage Blade™ computer coexisting in a Blade™ center all running different operating systems (e.g. Windows, Linux, AIX, . . . and more.) Should a Blades™ center be treated as a LE product or a HE product?

In addition to design and system complexity issues discussed above, financial considerations are an important aspect of any outsourcing decision. Typically a LE product group is composed of higher-volume lower-profit-margin products. Accordingly, the HE product grouping would more typically have lower-volume higher-profit-margin products. However, in practice there exists a substantial number of lower-volume lower-margin-products and some higher-volume higher-margin-products.

A product's profit margin is often times a function of where in its life cycle the product resides. For instance, very new products, those products recently introduced to the market, and older products, those that have been available for some time and will soon be withdrawn from the market will typically have lower volumes. A new or revolutionary type of product may have a much higher profit-margin, independent of volume, especially if few competitors exist.

A question many companies face is whether financial considerations should go into the outsourcing decision? Clearly it would seem that a business would want to proceed more cautiously with higher-profit-margin products because the risk of outsourcing difficulties may not be worth the manufacturing cost saved. On lower profit-margin products, however, outsourcing to gain lower-cost manufacturing may be a necessity.

Determining which products are too complex and difficult to outsource and which are not, continues to be a challenge. Prior-art methods and systems for making outsourcing determinations have suffered from the disadvantage of being based on high-level subjective opinions. Incorrect decisions have been shown to have less than optimal consequences.

Accordingly, a need exists to overcome the difficulties with optimizing manufacturing outsourcing and to provide an objective and more repeatable system to determine product manufacturing outsourcing decisions.

SUMMARY OF THE INVENTION

The present invention provides a system and method for assigning a sourcing disposition to a product to be manufactured. According to an embodiment of the present invention, a product is assigned a set of attributes within two or more scoring categories. A score between 1 and 10 is assigned to each attribute. The attribute scores within each category are summed to get a total point score for that category. Because each category does not necessarily have the same number of attributes, the attributes in each category are normalizing so that the range of scores in each category is comparable. It is then determined whether the normalized score in each category varies from the normalized score in any other of the categories by more than a predefined limit. A sourcing disposition is then determined for each product based upon the determination of whether the normalized score in each category varies from the normalized score in any other of the categories by more than the predefined limit.

In an embodiment of the present invention, the sourcing disposition options are in-house fulfillment, outsourcing, and further evaluation of the assigned scores.

In one embodiment of the present invention, the categories are design and manufacturing complexity; financial considerations, and products offering solution complexity & customer experience.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an," as used herein, are defined as "one or more than one." The term "plurality," as used herein, is defined as "two or more than two." The term "another," as used herein, is defined as "at least a second or more." The terms "including" and/or "having," as used herein, are defined as "comprising" (i.e., open language). The terms "program," "software application," and the like as used herein, are defined as "a sequence of instructions designed for execution on a computer system." A program, computer program, or software application typically includes a subroutine, a function, a procedure, an object method, an object implementation, an executable application, an applet, a servlet, a source code, an object code, a shared library/dynamic load library and/or other sequence of instructions designed for execution on a computer system.

While the specification concludes with claims defining the features of the invention that are regarded as novel, it is believed that the invention will be better understood from a consideration of the following description in conjunction with the drawing figures, in which like reference numerals are carried forward.

Overview

Described now is an exemplary method and system for assigning scientific product complexity quantification values to individual products for accurate and objective sourcing determinations. The present invention produces a specific percent complexity index rating for each product. The index ratings can then be graphed and compared to other products. Products with differences in the design complexity, financial complexity, and product solution complexity index rating can be easily identified so unique and difficult to quantify products can be dealt with individually.

The system also has the advantage that new characteristics can easily be added to the complexity index. Also, in the event an error occurs in the scoring of any single characteristic, that error will have little effect on the overall rating. In general, small errors in evaluating different characteristics will tend to cancel each other out, helping to produce an accurate overall complexity rating index.

Outsourcing Disposition Groups

The present inventive method and system provides attribute scoring of individual products so that each product is sorted into a sourcing disposition group. The products are categorized based on scores assigned to a set of defined critical attributes. In one embodiment of the present invention, the sourcing disposition groups are as follow:

1. Outsource;
2. In House Fulfillment; and
3. In House Fulfillment or Potential Outsource.

Outsourced products are those products that are built or manufactured by those other than the subject company performing the evaluation of the present invention. Outsourcing is often performed in countries where cheaper labor prices and/or cheaper materials are available. Outsourcing also includes domestic manufacturing by others. In-house fulfillment is manufacturing performed by or directly under the direction of the subject company itself. In-house fulfillment is generally reserved for products that have a high degree of complexity or other various attributes that will be discussed below. The third group consists of products that do not clearly fall into group one or group two. One of the advantages of the present invention is that these products are readily recognized and can be singled out for a more detailed analysis and sourcing designation.

Outsourcing Considerations

One embodiment of the present inventive method and system closely examines each individual product in order to assess and quantify key attributes of a product by utilizing three critical outsourcing consideration categories, which are:

1. Design and Manufacturing Complexity;
2. Financial Considerations; and
3. Product Offering Solution Complexity & Customer Experience.

It should be noted that the invention is not limited to the above three considerations categories.

Complexity Assessment

The present invention assesses the complexity of a product so that the product can be assigned to the proper category and sourcing group. To determine the complexity, each of the key product attributes is given a plurality of detailed critical quantifiable product traits. A detailed scoring criteria for each attribute is then applied to each product individually to determine the appropriate score so that each individual product can be assessed via a bottoms up scoring and evaluation system that helps remove subjectivity from the complexity assessment processes. Mathematically combining the detailed traits provides a high-level key attribute quantification.

In one embodiment of the present invention, the bottoms-up fulfillment complexity assessment of individual products uses about 30 detailed attributes distributed between the three categories. A list of N attributes for a single category are shown in table 1. Each attribute A-Z is evaluated and assigned a score from 0 to 10. The attribute scores for the category are then mathematically summed and normalized to produce a higher-level normalized category score that varies from 0 to 10. The normalized values ranging from 0 to 10 can then be directly converted to a percent of complexity with 100% being the most complex and 0% being the least.

TABLE 1

|   | Attribute | Score |
|---|-----------|-------|
| 1 | A | 2 |
| 2 | B | 10 |
| 3 | C | 1 |
| 4 | D | 6 |
| ... | ... | ... |
| N | Z | 10 |
|   | Total Score | 130 |
|   | Normalized Score | =7 |
|   | Percent | =70% |

A Range of scores is assigned to each disposition group. Products can be categorized into one of the groups based on that product's normalized value. For instance: group 1, which consists of primarily low-value, high-volume products, is assigned all products receiving a normalized score from 0 to 39; group 2, which consists primarily of items, such as rack-mounted products that are complex because of the integration of multiple servers and I/O, is assigned all products receiving a normalized score from 40-69; and group 3, which consists primarily of large, high-performance, complex, high-profit, low-volume systems is assigned all products receiving a normalized score from 70-100. It should be noted that the numbers listed herein are exemplary only and other quantities and ranges can be used and are within the spirit and scope of the invention.

The normalized combined score for each product is graphed so that those products can be compared and those that do not fit neatly into the model can be easily identified and dealt with individually to help determine the appropriate sourcing disposition. For instance, if the scores for all three attribute areas—design and manufacturing complexity; financial considerations; and product offering solution complexity & customer experience—are in the range of from 70 to 100%, then the product is accepted into the third disposition group. If only 2 of the 3 attribute areas have normalized scores that are within the same disposition grouping range, the product can be singled out and reasoning is applied to determine the cause of group disagreement so that the product can be placed in the proper disposition group. Finally, if none of the attribute area scores agree, each area of scoring is examined to develop a consensus reasoning so that the product can be placed in the proper disposition group.

Critical Attributes

The three outsourcing considerations—design and manufacturing complexity, financial considerations, and product offering solution complexity & customer experience—were discussed above. In accordance with one embodiment of the present invention, each of these outsourcing considerations has associated with it a set of critical attributes. A few exemplary critical attributes for each category are as follow. It should be noted that each category is not limited to these attributes and other attributes are within the spirit and scope of the invention. In addition, new attributes can be easily added at any time to any complexity index.

I. Design and Manufacturing Complexity Index
(1) Quantity of features offered
(2) Physical product or subassembly size and weight
(3) Packaging and shipping criteria—industry standard v. special packaging
(4) WIP movement through the manufacturing line
(5) Number of physically interconnected chassis or interface connections between chassis and attachable I/O drawers
(6) Inline quality
(7) Test coverage/technician interaction with product
(8) Significance of parts reutilization
(9) Quality/product reliability
(10) Install time/problems
(11) Manufacturing cycle time
(12) Level of material asset protection required II. Financial Complexity Index
(1) Revenue
(2) Gross Profit %
(3) Royalty %

III. Product Offering & Customer Solution Complexity Index
(1) Level of solutions content—cross brand, non-manufacturer, custom software and rate card services in the offering
(2) Degree of customer participation in defining and selecting final product configuration
(3) Degree and extent of combined hardware/software features, virtualization and clustering offered for ordering
(4) Product records maintenance—history based machine type, model, or machine equipment specification upgrades Scoring In one embodiment of the present invention, each attribute is analyzed and given a score from 0 to 10 where 0 is the most basic (least complex) and ten is the most complex. The score for each attribute is summed and then divided by the number of attributes in each overall attribute category to produce a total normalized score with a minimum of 0 and a maximum of 10. The normalizing step ensures that areas with differing numbers of scorable attributes can be compared. The normalized value is then converted to a percent. As a percent value, the total sum for each of the outsourcing considerations—development/manufacturing complexity, financial considerations, and the customer solution complexity—can be compared on an equivalent complexity scale. Additionally, the sum from each overall attribute category is combined into an overall percent complexity score. Other scales and mathematical methods can be used for comparing the categories and are within the spirit and scope of the invention.

Below is a list of exemplary attributes that are assigned to a product and scored according to one embodiment of the present invention.

I. Details of Design and Manufacturing Complexity Index

Quantity of Features Offered

Lower values are assigned to those products having a relatively small number of features and/or well-defined configuration types. Higher values are assigned to those products with many features, possible manual intervention required, special customer placement allowed, multi-OS (Operating System) preloads offered, LPAR (Logical Partitions) & PPARS (Physical Partitions) configurations, capacity on-demand upgrades. The higher values correspond to the product's increased supply chain complexity, additional supply/demand planning considerations, and additional inventory to manage within process, among others.

The Physical Product or Subassembly Size and Weight

On the low end of the scale are products light enough to pick up (<60 lbs) or high-volume parts that move along a conveyer/flow rack and on the high end are products that need to be disassembled, require special lifts/cranes (>150 lbs), low-volume products with frames having castors, products requiring fork lifts for movement, or those that must be disassembled for shipment. A few considerations for the high-end group are heavy electrical and cooling loads driving the building infrastructure, more specialized tooling, and test equipment fixtures.

The Packaging and Shipping Criteria

Single products shipped in one basic industry standard box or crate are scored at the low end of the scale, while more complex products requiring specialized packages (e.g. vapor barriers), special fragility considerations, or multiple pallets are scored at the high end. Extra cost is associated with products that require extensive freight carrier/mode constraints (i.e., climate control vans, upper deck requirements in planes, and more.)

WIP Movement Through the Manufacturing Line

Ranks higher-volume automated products at the low end and lower volume products with specialized steps and roll on castor or movement by fork lift or conveyors or flow racks between work stations on the high end.

The Number of Physically Interconnected Chassis or Interface Connections

Individual system units are on the low end and systems with many discrete processors within a cluster with and without a switch or SMP (Symmetric Multiprocessors) node structure with HMCs (Hardware Maintenance Consoles) are on the high end. The high-end ranking corresponds to additional opportunities for assembly/test error and more specific process work direction required for low-pay and/or low-skilled operators.

Inline Quality

This attribute is a measure of percent yield in manufacturing. Products that have higher numbers of multiple defects per product during manufacturing are scored on the high end.

Test Coverage/Technician Interaction with Product

This attribute is scored where very basic verification of proper assembly is on the low end and products with RAS T&A (Reliability, Availability, and Serviceability Test and Acceptance) specs requiring extensive stress testing with techniques like automated keystrokes emulation or an automate-able interface are on the high end. The higher score is a product of sophistication of product quality, test, and software installation. Source code transfer can introduce significant lag in development of technician product knowledge and skill. An additional factor moving a product to the higher scores is the large investment required for unique test equipment.

Significance of Parts Reutilization

Products having parts with little or no reuse are scored at the low end, while those products having extensive parts ETN (Equivalent to New) processes and many Net-Price MES's (Machine Equipment Specifications) are at the high end.

Quality

The designed or necessary quality of a product can be an accurate indicator of sourcing. Consumer products with useful lives of less than about 3 years are scored at the low end of the scale. Some commercial products, on the other hand, have useful lives of greater than about 20 years. These longer life products will be scored at the high-end of the scale.

Install Time and Install Problems

This attribute is scored to identify installation issues. Products that are relatively easy to install and customer-setup products (800 number customer assistance) are placed on the low end. On the high end are products where installs are vigorously monitored, have long install times, or that require customer engineered installation.

Manufacturing Cycle Time

Products that manufactured at a rate of multiple units per hour provide greater confidence that customer orders will be filled and are scored on the low end of the scale. Individual products that take several hours or days to produce are more likely to incur delays and, as a result, should be scored on the high end of the scale.

Level of Material Asset Protection

Ranks products with low-dollar value at the low end and products with a very high dollar value at the high end of the scale. Higher dollar valued product bring with them a high risk of theft and, therefore, a number of security precautions that need to implemented, such as specific access-controlled cribs that the products are placed into at various times along the manufacturing process.

II. Details of Financial Complexity Index

Revenue

Revenue scores can be assigned based on the actual or projected revenue a particular product brings or is expected to earn for the company. Higher revenue implies greater value to the company and thus, the more control the company will want over the fulfillment source. Therefore, products needing greater control will be assigned a higher score than those that do not.

The chart below shows exemplary dollar values (in Millions) and exemplary scores corresponding to each dollar range.

| |
|---|
| 0 to 10 = 1 |
| 11 to 20 = 2 |
| 21 to 50 = 3 |
| 50 to 100 = 4 |
| 100 to 200 = 5 |
| 200 to 400 = 6 |
| 400 to 600 = 7 |
| 600 to 800 = 8 |
| 800 to 1000 = 9 |
| Greater than 1000 = 10 |

Gross Profit Percentage

Very similar to the revenue considerations discussed above, products having a higher gross profits margin are more valuable to the company and, as a result, will justify more control over the fulfillment source. Products needing greater control will be assigned a higher score than those that do not.

The chart below shows exemplary percentage values and exemplary scores corresponding to each range of percentages.

| |
|---|
| 0 to 5 = 1 |
| 6 to 9 = 2 |
| 10 to 19 = 3 |
| 20 to 29 = 4 |
| 30 to 39 = 5 |
| 40 to 49 = 6 |
| 50 to 59 = 7 |
| 60 to 69 = 8 |
| 70 to 79 = 9 |
| 80 to 100 = 10 |

Royalty Percentage

Products having a high royalty percentage are more valuable to the company than those that do not, and, as a result, will justify more control over the fulfillment source. Products needing greater control will be assigned a higher score than those that do not.

The chart below shows exemplary percentage values and exemplary scores corresponding to each range of percentages.

| |
|---|
| 0 to 5 = 1 |
| 6 to 10 = 2 |
| 11 to 15 = 3 |
| 16 to 20 = 4 |
| 21 to 25 = 5 |
| 26 to 30 = 6 |
| 31 to 35 = 7 |
| 36 to 40 = 8 |
| 41 to 45 = 9 |
| greater than 46 = 10 |

III. Details of Product Offering & Customer Solution Complexity Index

Level of Solutions Content

Products that are typically purchased as a standalone product are scored at the low-end of the scale. Products that are frequently used in multi-product solutions or as part of a larger multi-system/software/brand/OEM or "Rate-Card" solution are scored at the higher-end of the scale. A "Rate Card" is a menu of different configuration or fulfillment services that are offered to customers at specified prices Degree of Customer Participation in Defining and Selecting Final Product Configuration Where a product is placed on the score scale in this attribute category is a function of the amount of assistance a customer is expected to require during the ordering stage. Many companies now offer web-based interfaces where customers can access a particular web page and directly order products through the sales front end of the web page. These types of interfaces require very little involvement by company employees, and will therefore receive a low-end score. On the opposite end of the scale are those products that require customer service representatives or customer service order representatives to enter orders or configurations through company channels, such as scheduling software or configuration tools. The products that require involvement by customer representatives are assigned higher scores. The higher scores correspond to the increased level of hardware/software configuration required on the initial customer order for a specialized one-of-a-kind product integration requiring supply chain tools to rapidly take orders and configure products for delivery.

Degree and Extent of Combined Hardware/Software Features, Virtualization, and Clustering Offered for Ordering Lower scores in this category are assigned to relatively basic products, such as rack mount servers and storage units and those products having preloaded operating systems, such as Windows, Linux, and the like. At the other end of the scale are products requiring more complex levels of hardware/software/firmware integration, specialized one-of-a-kind orders requiring supply chain tools, manual interruption of process flow, and those that require unique hardware/software placement and connections.

Product Maintenance Records

Some products require a more extensive maintenance that others. In fact, many sophisticated products are now provided with Vital Product Data (VPD), which are non-volatile memories that contain information for that particular product's maintenance history, as well as other information. For some products, it is necessary to build and maintain a record of the product's features and upgrade history by customer/serial number.

Those products that do not require VPDs are scored at a lower end of the scale than those products that do. Some products having VPDs will be given mid-level scores, while those products that require extensive us of VPD when configuring machine equipment specification orders, net-pricing, or customer investment protections through serial number transfers will be at the high end of the scale.

Results

One of the important benefits of the present inventive system is that it is does not rely on precise accuracy of the scoring in all areas to determine the proposed disposition of each product. Since multiple detailed attributes are used, errors in the scoring of one attribute are likely to be canceled out by errors in the other direction in the scoring of another attributes. Since the total normalized scoring is shown relative to all other products, it is easy to identify mistakes to compare one product with all other products.

Those products that received low scores in all three areas are immediately identified as proper candidates for outsourcing. Similarly, those products that scored high in all three areas are immediately identified as candidates for in-house processing. Advantageously, the present invention identifies those products that are inconsistent in the three scoring areas and brings close-call products to light. These are exactly the products that require detailed evaluation and, with prior-art methods, may have been expeditiously placed into an improper category.

Information Processing Unit

Figure 1:
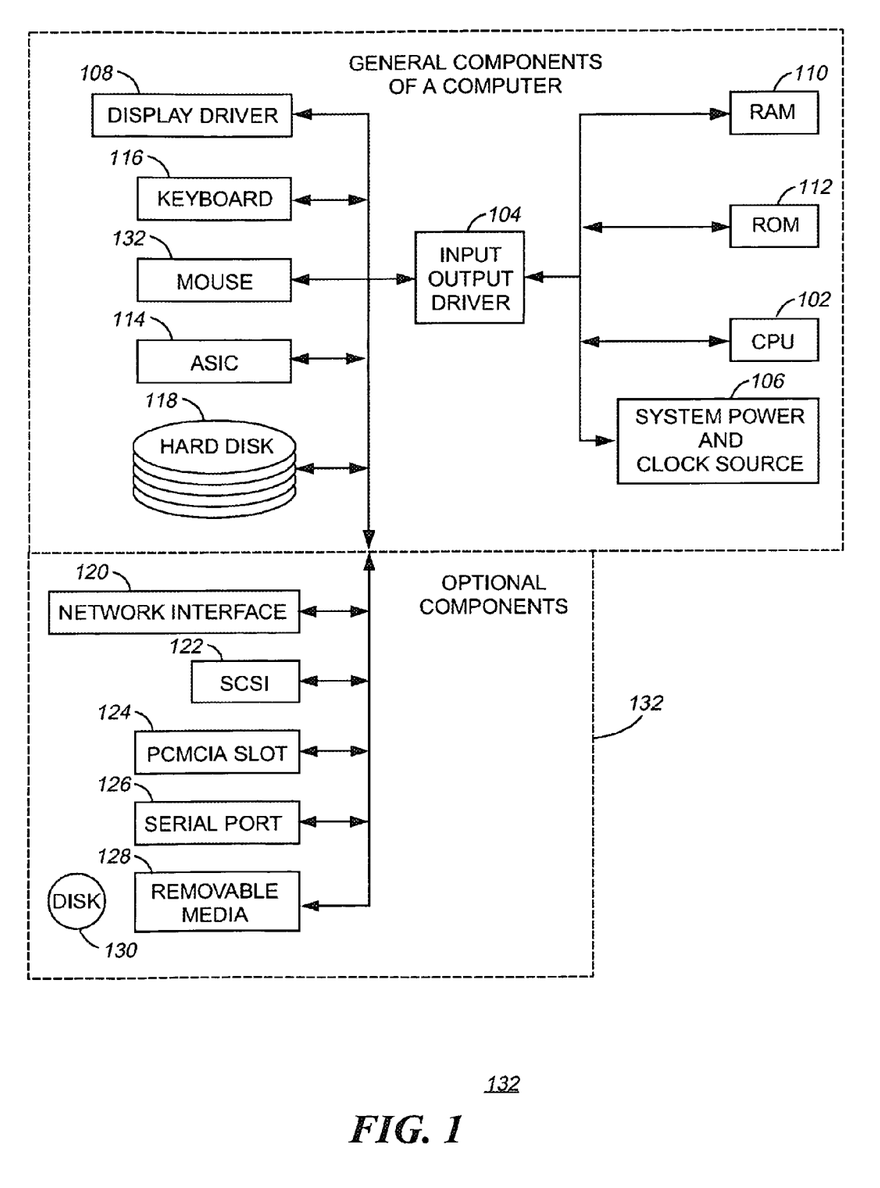
FIG. 1 is a block diagram illustrating the general components of a computer, according to the present invention.

The present invention can be realized in whole or in part on an information processing system. Referring to FIG. 1, there is shown a block diagram 100 of the major electronic components of an information processing system 100 in accordance with the invention. The electronic components include: a central processing unit (CPU) 102, an Input/Output (I/O) Controller 104, a mouse 132 a keyboard 116, a system power and clock source 106, display driver 108, RAM 110, ROM 112, ASIC (application specific integrated circuit) 114 and a hard disk drive 118. These are representative components of a computer. The general operation of a computer comprising these elements is well understood. Network interface 120 provides connection to a computer network such as Ethernet over TCP/IP or other popular protocol network interfaces. Optional components for interfacing to external peripherals include: a Small Computer Systems Interface (SCSI) port 122 for attaching peripherals, a PCMCIA slot 124, and serial port 126. An optional diskette drive 128 is shown for loading or saving code to removable diskettes 130. The system 100 may be implemented by combination of hardware and software. Moreover, the functionality required for quantifying complexity values may be embodied in computer-readable media (such as 3.5 inch diskette 130) to be used in programming an information-processing apparatus (e.g., a personal computer) to perform in accordance with the invention. It should be noted that an information processing unit is not necessary for realizing the present invention.

Process Flow

Figure 2:
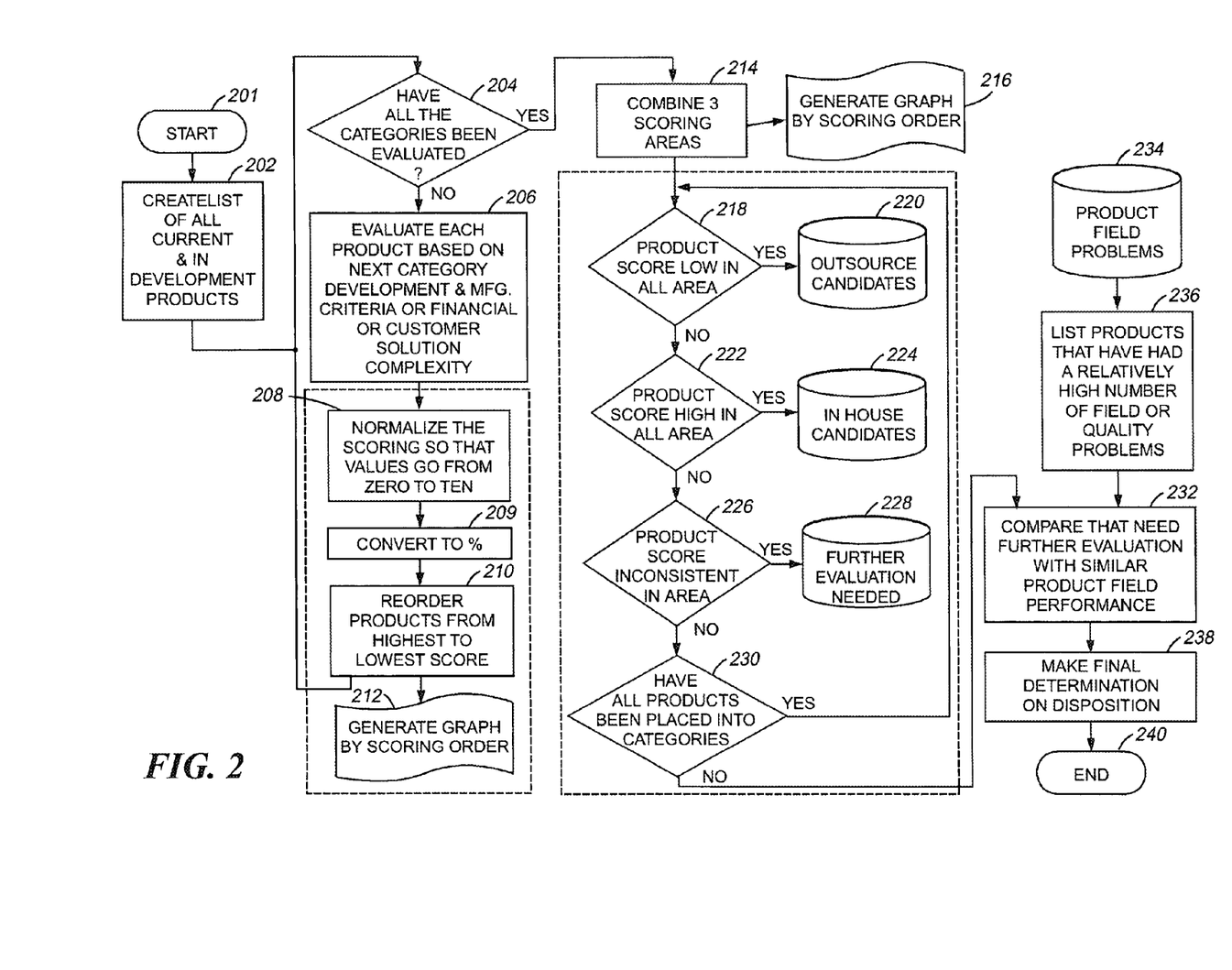
FIG. 2 is a flow diagram illustrating a method of assigning a sourcing designation to a product, according to the present invention.

FIG. 2 provides a process flow diagram of the present invention carried out on a computer of FIG. 1. The process begins in step 201 and moves straight to step 202, where a list of products that are to be evaluated is created. The list can include current as well as products still in development. The flow moves to step 204 where it is determined whether all categories have previously been evaluated. If the answer to step 204 is "no," the process moves to step 206 where each product is evaluated based on a remaining category. Each product will, therefore, be evaluated until according to the attributes in each category. After the evaluation with regard to the remaining category, the flow moves to 208, where, as shown in Table 1, the scoring of the evaluations is normalized so that the values go from 0 to 100. The normalized values are then converted to a percentage between 0 and 100% in step 209.

Figure 3:
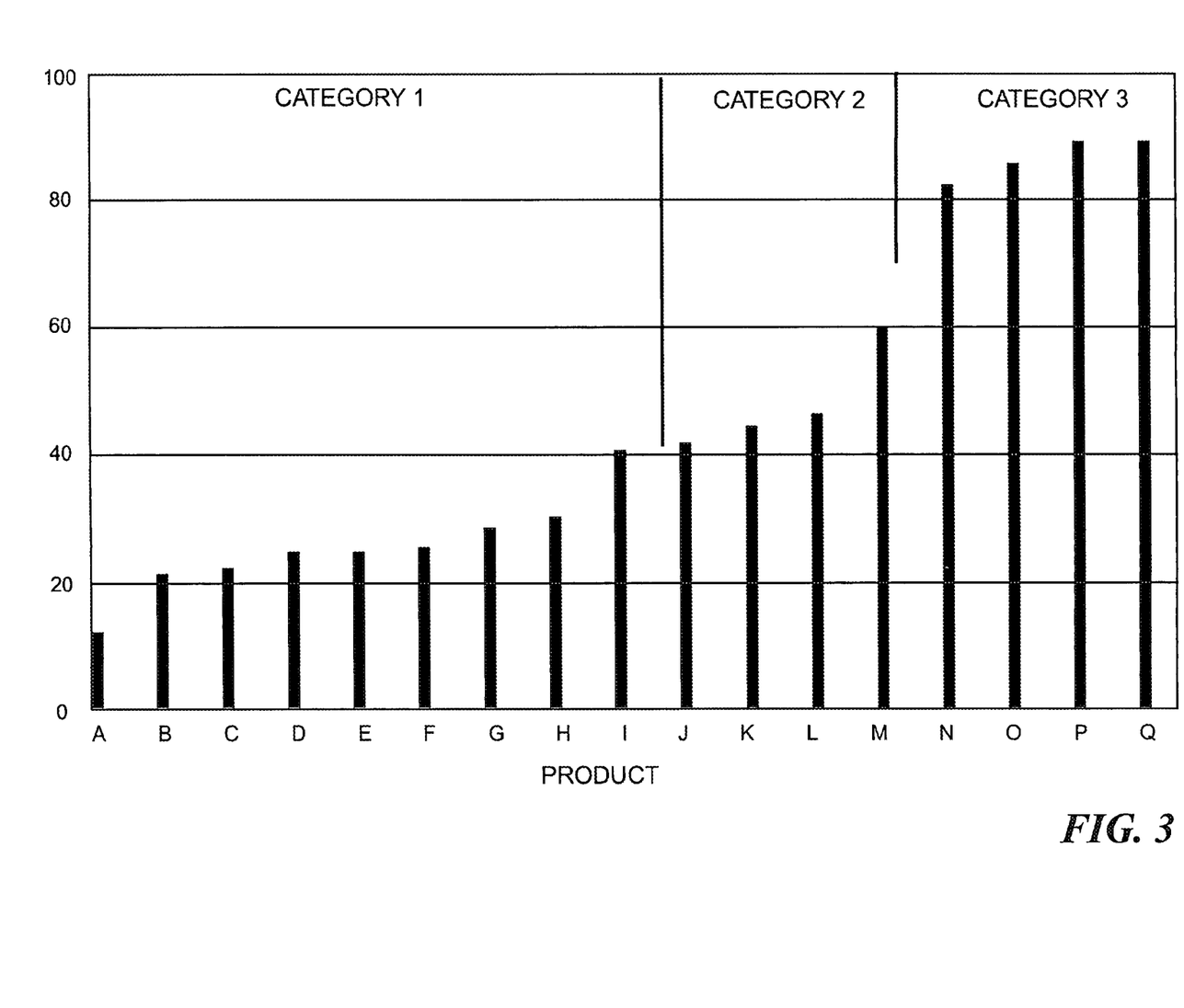
FIG. 3 is a graph showing a set of products evaluated under a Design and Manufacturing Complexity category and ranked by attribute score, according to the present invention.
Figure 4:
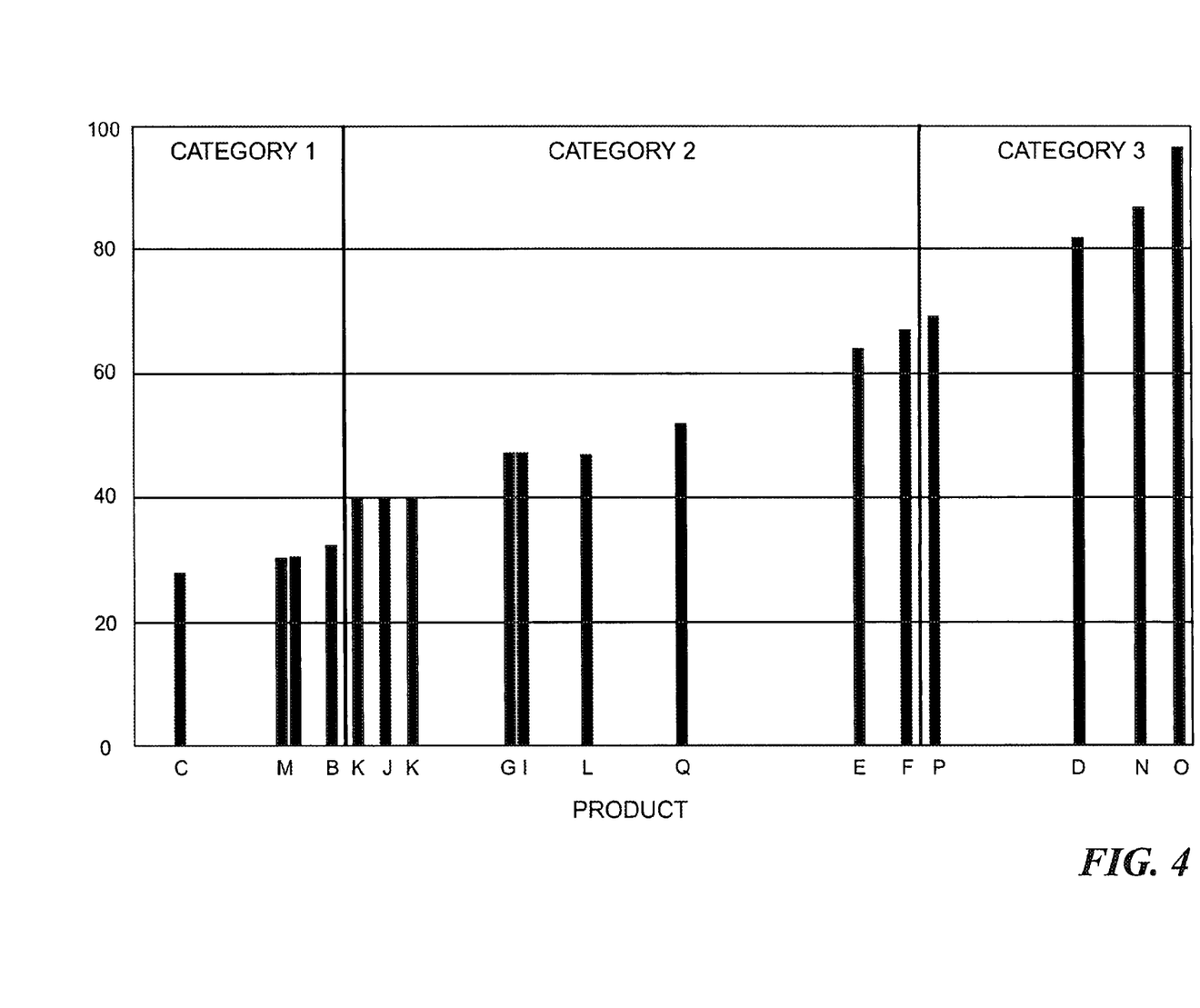
FIG. 4 is a graph showing a set of products evaluated under a Financial Considerations category and ranked by attribute score, according to the present invention.
Figure 5:
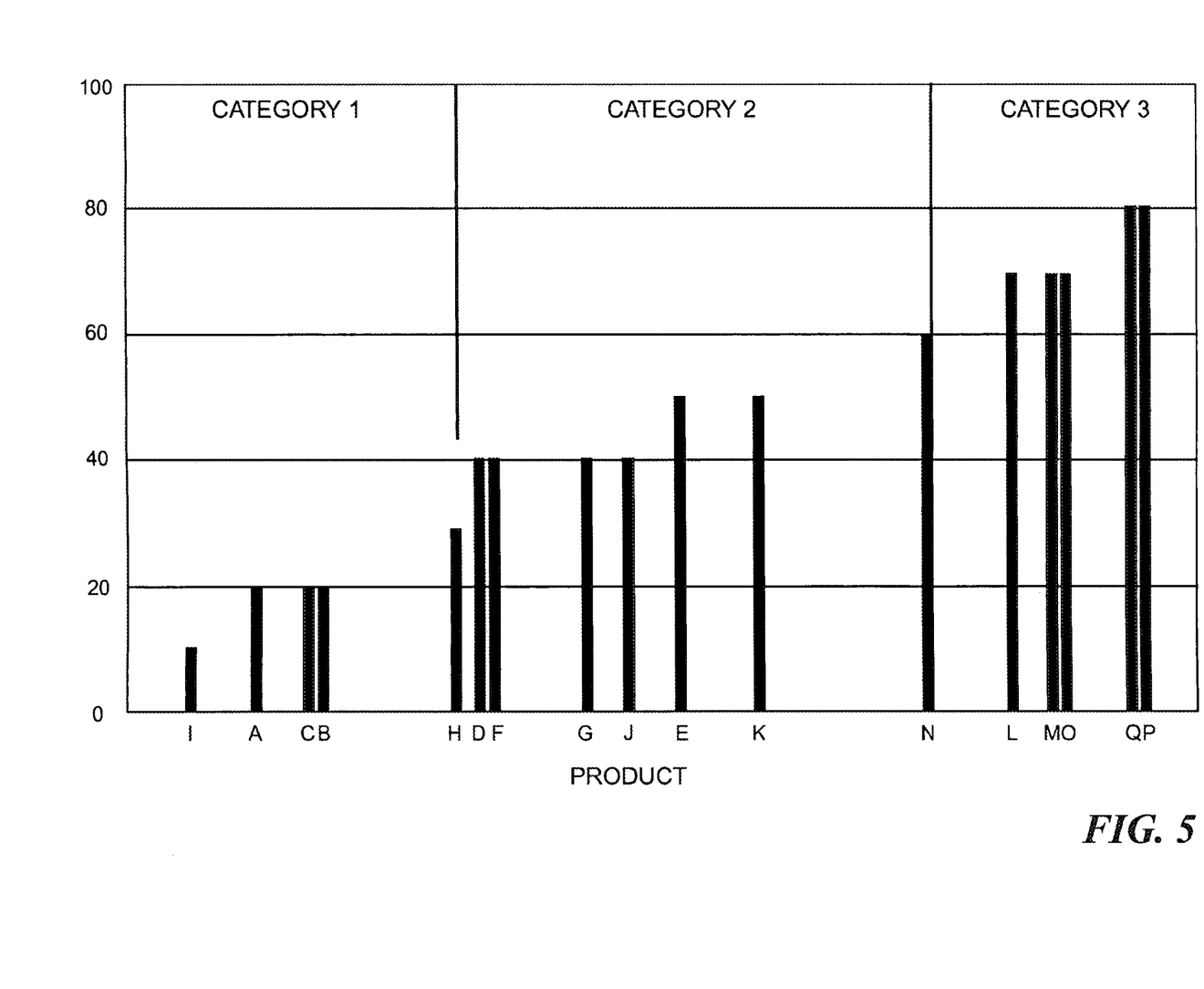
FIG. 5 is a graph showing a set of products evaluated under a Product Offering Solution Complexity & Customer Experience category and ranked by attribute score, according to the present invention.
Figure 6:
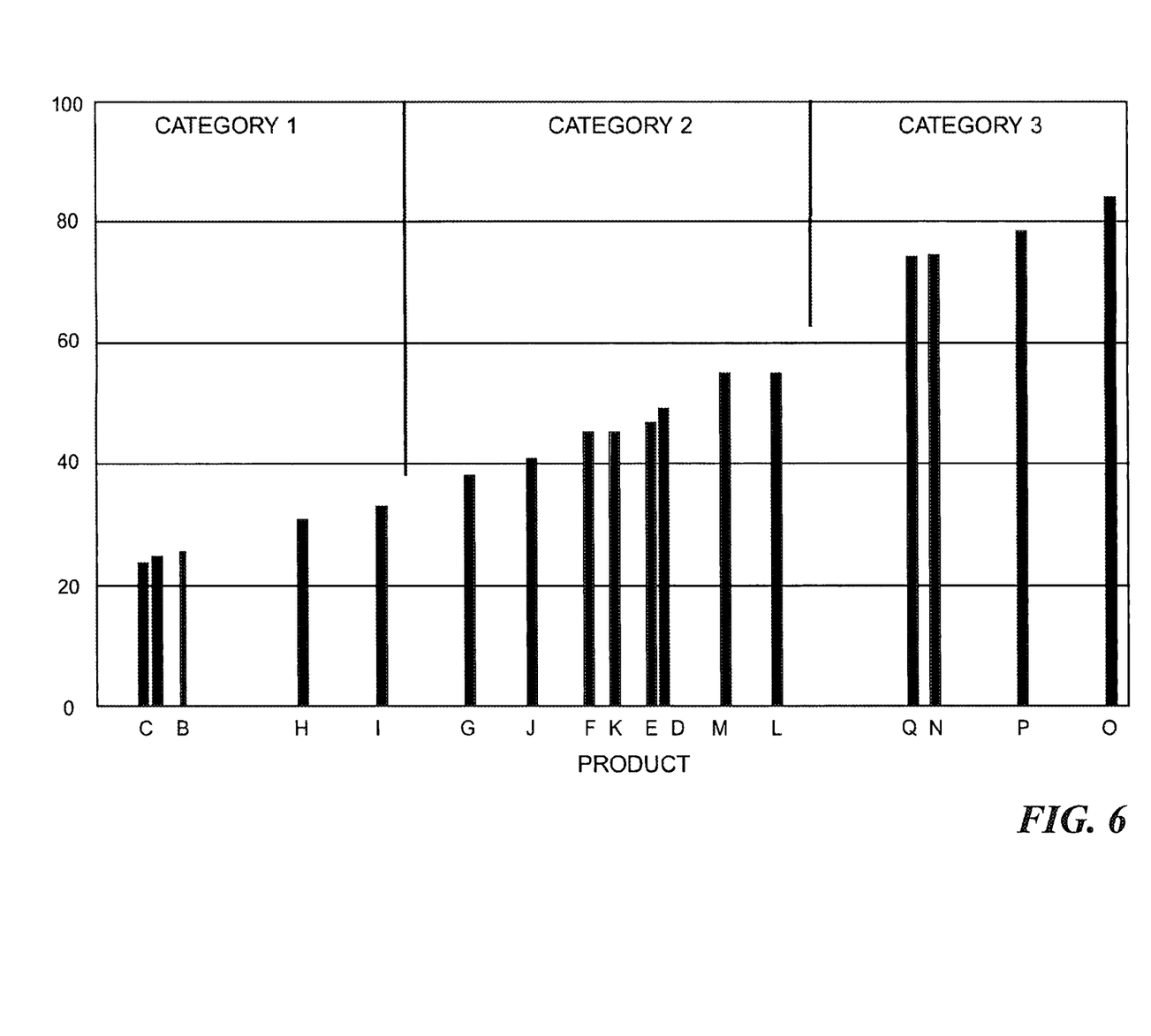
FIG. 6 is a graph showing a set of products ranked according to an average of rankings in FIGS. 3-5, according to the present invention.

In the next step, 210, the products are ordered from highest to lowest and in step 212, as shown in FIGS. 3-5, a graph organized by product scoring order is generated for each category. Simultaneously, the flow moves back to step 204, where each product is examined to ensure that all three categories have been evaluated. If all three categories have been evaluated, the flow moves to step 214, where the 3 scoring areas are combined. The combination can be a summation, an average of the scoring areas, or other mathematical method of comparing one product against a second or more products. A second graph is generated in step 216, and shown in FIG. 6, to show the scoring order of the products according to the 3 combined scoring areas.

Simultaneous to the second graph being generated in step 216, a check is performed in step 218 to determine which products scored low in all scoring areas. The products that scored low in all three scoring areas are then designated in step 220 as outsource fulfillment candidates. Outsource candidates are those products that are basic enough to be built by those other than the subject company.

The products that did not score low in all three scoring areas are then evaluated in step 222 to determine the products that scored high in all three areas. The products that scored high in all three scoring areas are then designated in step 224 as in-house candidates. In-house candidates are products that will be built on site or at another location under the direction of the subject company.

The flow then moves to step 226 where the products that are inconsistent, that is, did not either score high in all areas or low in all areas, are identified. The identified products are designated in step 228 as "Further Evaluation Needed." These products will be examined to find the cause for the inconsistency. The evaluation analysis used to resolve a "Further Evaluation Needed" product into the appropriate category may involve the use of a voting scheme. In cases where 2 of the 3 attribute groups (i.e. Dev/Mfg, Financial, Customer Experience) yield the same category disposition, the product is placed in that majority category. If all 3 attribute groups each yield a different category for disposition (i.e. there is no majority), then a manual analysis is invoked that utilizes technical and business priority judgments of the evaluator(s). The judgment decision decides which factors are more 'strategic' for the company (say, focusing on customer satisfaction), or perhaps by looking at the trend of the scoring through time i.e. seeing which way the metrics are heading. This may lead to a decision to leave products in-house for a specific period of time and put in place a plan to outsource beyond that. In this case, the scoring system acts as a pointer towards products that should be outsourced in the future, to allow time for plans to be put in place.

The flow then moves to step 230 where a check is done to ensure that all products in the list have been placed into one of the three categories. If not all products have been placed, the flow moves back up to step 218. If all products have been designated for their appropriate categories, the process moves to step 232.

In some situations, a product will experience a high number of problems in the field. Product evaluation is necessary to determine the course of action that is to be taken to rectify the problems. One such course of action is to move a product from an outsourcing facility to in-house, where the product manufacturing can be scrutinized and controlled at a level not available out-of-house.

Product field problems are identified in step 234. In step 236, a list is created containing those products that have had a relatively high number of failures or quality problems. In step 232, the listed products and the products coming from step 230 that are categorized in the "Further Evaluation Needed" group are compared to the field performance of other products so that errors in the sourcing designation can be identified. Finally, in step 238, a final determination is made as to what the sourcing disposition of the product should be or whether the disposition of the product should be changed. The flow ends at step 240.

While the various embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A computer program product comprising:
   a storage medium read by an information processing system comprising a processing circuit and storing instructions for execution by the information processing system for performing a method comprising:
   creating a list for assigning a sourcing disposition of at least one product to be manufactured;
   receiving a score for each of a plurality of attributes within at least two categories of attributes associated with the product to be manufactured, wherein the score is independent of the at least two categories of attributes;
   summing, for each of the at least two categories, the score for each of the plurality of attributes therein to form a summed score in each separate category;
   normalizing the summed score in each category so that a range of scores for each separate category is comparable;
   determining whether the summed score which has been normalized in each separate category varies from the summed score which has been normalized in any other of the categories by more than a predefined limit; and
   selecting, based on the determining performed, one of the following sourcing dispositions for the product, an in-house sourcing disposition when the summed score is located within a first range;
an outsourcing disposition when the summed score is located within a second range; and
further evaluation when the summed score is located within a third range.

2. The computer program product according to claim 1, wherein at least one of the at least two categories is one of:
design and manufacturing complexity;
financial considerations; and
products offering solution complexity and customer experience.

3. The computer program product according to claim 2, wherein the category of design and manufacturing complexity includes at least one of:
quantity of features offered;
physical product or subassembly size and weight;
packaging and shipping criteria;
WIP movement through a manufacturing line;
number of physically interconnected chassis or interface connections between chassis and attachable input and output drawers;
inline quality;
test coverage with product;
technician interaction with product;
significance of parts reutilization;
quality reliability;
product reliability;
install time;
install problems;
manufacturing cycle time; and
level of material asset protection required.

4. The computer program product according to claim 2, wherein the category of financial considerations includes at least one of:
revenue;
gross profit percentage; and
royalty percentage.

5. The computer program product according to claim 2, wherein the category of products offering solution complexity and customer experience includes at least one of:
level of solutions content;
degree of customer participation in defining and selecting final product configuration;
degree and extent of combined hardware/software features, virtualization and clustering offered for ordering; and
product records maintenance.

6. The computer program product according to claim 1, wherein the disposition is one of either in-house fulfillment and outsourcing if the summed score which has been normalized in each separate category vary from the normalized score in each other category by less than the predefined limit.

7. The computer program product according to claim 1, wherein selecting the sourcing disposition further comprises:
ranking the product among other products based upon the summed score in each separate category which has been normalized for the product, and the sourcing disposition is selected based upon the determination and the ranking.

8. The computer program product according to claim 7, wherein based upon comprises:
summing the summed score that has been normalized from all of the categories so that the product has a single compilation score.

9. The computer program product according to claim 7, wherein based upon comprises:
averaging the summed score that has been normalized from all of the categories so that the product has a single average score.

10. The computer program product according to claim 1, further comprising:
converting the summed score that has been normalized to percentages before determining a sourcing disposition.

11. A method, with an information processing system, the method comprising:
creating a list for assigning a sourcing disposition of at least one product to be manufactured;
receiving by an information processing system, a score for each of a plurality of attributes within at least two categories of attributes associated with the product to be manufactured, wherein the score is independent of the at least two categories of attributes;
summing, by an information processing system, for each of the at least two categories, the score for each of the plurality of attributes therein to form a summed score in each separate category;
normalizing by an information processing system, the summed score in each category so that a range of scores for each separate category is comparable;
determining whether the summed score which has been normalized in each separate category varies from the summed score which has been normalized in any other of the categories by more than a predefined limit; and
selecting, by the information system, based on the determining performed, one of the following sourcing dispositions for the product,
an in-house sourcing disposition when the summed score is located within a first range;
an outsourcing disposition when the summed score is located within a second range; and
further evaluation when the summed score is located within a third range.

12. The method according to claim 11, wherein at least one of the at least two categories is one of:
design and manufacturing complexity;
financial considerations; and
products offering solution complexity and customer experience.

13. The method according to claim 12, wherein the category of design and manufacturing complexity includes at least one of:
quantity of features offered;
physical product or subassembly size and weight;
packaging and shipping criteria;
WIP movement through a manufacturing line;
number of physically interconnected chassis or interface connections between chassis and attachable input and output drawers;
inline quality;
test coverage with product;
technician interaction with product;
significance of parts reutilization;
quality reliability;
product reliability;
install time;
install problems;
manufacturing cycle time; and
level of material asset protection required.

14. The method according to claim 12, wherein the category of financial considerations includes at least one of:
revenue;
gross profit percentage; and
royalty percentage.

15. The method according to claim 12, wherein the category of products offering solution complexity and customer experience includes at least one of:
- level of solutions content;
- degree of customer participation in defining and selecting final product configuration;
- degree and extent of combined hardware/software features, virtualization and clustering offered for ordering; and
- product records maintenance.

16. The method according to claim 11, wherein the disposition is one of either in-house fulfillment and outsourcing if the summed score which has been normalized in each category vary from the summed score which has been normalized in each other category by less than the predefined limit.

17. The method according to claim 11, wherein selecting the sourcing disposition further comprises:
- ranking the product among other products based upon the summed score in each separate category which has been normalized for the product, and the sourcing disposition is selected based upon the determination and the ranking.

18. The method according to claim 17, wherein based upon comprises:
- summing the summed score which has been normalized from all of the categories so that the product has a single compilation score.

19. The method according to claim 17, wherein based upon comprises:
- averaging the summed score which has been normalized from all of the categories so that the product has a single average score.

20. The method according to claim 11, further comprising:
- converting the summed score which has been normalized to percentages before determining a sourcing disposition.

21. An information processing system comprising:
- means for creating a list for assigning a sourcing disposition of at least one product to be manufactured
- means for receiving a score for each of a plurality of attributes within at least two categories of attributes associated with a product to be manufactured, wherein the score is independent of the at least two categories of attributes;
- means for summing, for each of the at least two categories, the score for each of the plurality of attributes therein to form a summed score in each separate category;
- means for normalizing the summed score in each category so that a range of scores for each separate category is comparable;
- means for determining whether the summed score which has been normalized in each separate category varies from the summed score which has been normalized in any other of the categories by more than a predefined limit; and
- means for selecting, based on the determining performed, one of the following sourcing dispositions for the product,
  - an in-house sourcing disposition when the summed score is located within a first range;
  - an outsourcing disposition when the summed score is located within a second range; and
  - further evaluation when the summed score is located within a third range.

22. The system according to claim 21, wherein at least one of the at least two categories is one of:
- design and manufacturing complexity;
- financial considerations; and
- products offering solution complexity and customer experience.

23. The system according to claim 22, wherein the category of design and manufacturing complexity includes at least one of:
- quantity of features offered;
- physical product or subassembly size and weight;
- packaging and shipping criteria;
- WIP movement through a manufacturing line;
- number of physically interconnected chassis or interface connections between chassis and attachable input and output drawers;
- inline quality;
- test coverage with product;
- technician interaction with product;
- significance of parts reutilization;
- quality reliability;
- product reliability;
- install time;
- install problems;
- manufacturing cycle time; and
- level of material asset protection required.

* * * * *